United States Patent [19]

Millet

[11] 4,308,366

[45] Dec. 29, 1981

[54] POLYCONDENSATION OF HYDROXYSILYLATED POLYSILOXANES

[75] Inventor: Claude Millet, Saint-Priest, France

[73] Assignee: Rhone-Poulenc Industries, Paris, France

[21] Appl. No.: 170,979

[22] Filed: Jul. 18, 1980

[30] Foreign Application Priority Data

Jul. 18, 1979 [FR] France .............................. 79 19128

[51] Int. Cl.³ ............................................ C08G 77/08
[52] U.S. Cl. ................................... 525/477; 525/474; 528/14; 528/20; 528/21; 528/23
[58] Field of Search .................... 528/20, 14; 525/474, 525/477

[56] References Cited

U.S. PATENT DOCUMENTS 2,542,334  2/1951  Hyde ..................................... 528/14
3,156,668  11/1964  Pike ...................................... 528/14
4,116,887  9/1978  Lehn et al. ............................ 528/20
4,138,543  2/1979  Bargain et al. ....................... 528/14

OTHER PUBLICATIONS

Journal of Polymer Science, *Polymer Letters Edition*, vol. 12 (1974), Wiley & Sons Publishers, pp. 217–220.

*Primary Examiner*—Wilbert J. Briggs, Sr.
*Attorney, Agent, or Firm*—Burns, Doane, Swecker & Mathis

[57] ABSTRACT

High molecular weight organopolysiloxanes are rapidly prepared, without formation of the low molecular weight polysiloxanes, by polycondensing a hydroxysilylated polysiloxane in the presence of a catalytic amount of a catalyst system including (i) an alkali or alkaline earth metal, and (ii) a polyheteromacropolycyclic co-catalyst having the structural formula:

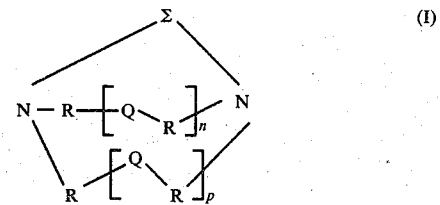

wherein Σ is a divalent radical having the structural formula

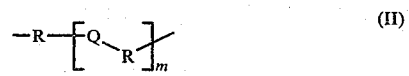

or a divalent radical having the structural formula:

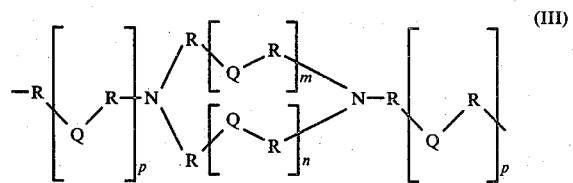

further wherein each R, which may be identical or different, is a divalent hydrocarbon radical, each Q, which also may be identical or different, is a divalent hydrocarbon radical, an oxygen atom or a sulfur atom, and m, n and p are each integers equal to 1, 2 or 3.

24 Claims, No Drawings

POLYCONDENSATION OF HYDROXYSILYLATED POLYSILOXANES

BACKGROUND OF THE INVENTION

1. Field of the Invention:

The present invention relates to a process for the polycondensation of polysiloxanes comprised of hydroxysilyl functions, and, more especially, to the catalysis of such polycondensation employing, as a co-catalyst therefor, an alkali or alkaline earth metal in conjunction with a certain polyheteromacropolycyclic compound.

2. Description of the Prior Art:

It is well known to this art that the silanols, silanediols and polysiloxanediols can be polycondensed in the presence of varied compounds which accelerate the polycondensation by acting as a dehydrating agent or catalyst (compare, for example, the treatise by Walter NOLL: *Chemistry and Technology of Silicones*, 1968 edition, pages 211 to 218).

Dehydrating agents of the aforesaid type which are representative are, on the one hand, acidic compounds, such as sulfuric and phosphoric acids and acid chlorides, and, on the other hand, non-acidic compounds, such as isocyanates, boric acid esters and the like. All of such agents must be used in stoichiometric proportions.

Catalysts of the aforesaid type which are representative are hydrogen halide acids, basic catalysts, such as alkali metal hydroxides, and amines, such as triethylamine. Finally, the polycondensation reaction can also be activated by conducting same in the presence of organometallic compounds of metals such as lead, tin, zirconium, aluminum, calcium, sodium, potassium and the like.

Moreover, these various catalysts are also reputed to promote equilibration among the siloxane bonds by opening the latter, with the subsequent polymerization of such opened bonds, and hence with the formation of volatile cyclic compounds [*Journal of Polymer Science*, 59, 259–269 (1962)]. It then appears to be obligatory to effect a devolatilization treatment, after the polycondensation, in order to ultimately obtain organosilicon elastomers possessing satisfactory properties.

French Pat. No. 2,168,439 then recommended the use of aluminum as a polycondensation catalyst, the aluminum optionally being coated with an oxide layer. A catalyst of this type, according to said French Pat. No. 2,168,439, does not give rise to transposition reactions among the siloxane bonds, but the polycondensation kinetics remain slow. It should, moreover, also be noted that the customary basic or acid catalysts as above outlined enable attainment of but a relatively slow rate of polycondensation.

SUMMARY OF THE INVENTION

Accordingly, a major object of the present invention is the provision of a novel catalytic system for the polycondensation of polysiloxanes bearing hydroxysilyl end groups, which catalytic system enables preparation, while using reduced amounts thereof, and with a rapid rate of polycondensation, of a high molecular weight condensed polysiloxane containing no, or vitually no, low molecular weight polysiloxanes; the re-equilibration reactions of the siloxane bonds, which are responsible for generating such low molecular weight polysiloxanes, are thus avoided.

Briefly, this invention features a process for the polycondensation of organopolysiloxanes comprising hydroxysilyl functions, characterized in that the polycondensation is carried out in the presence of a catalytic system which comprises an alkali or alkaline earth metal and, as a co-catalyst therefor, a certain polyheteromacropolycyclic compound.

DETAILED DESCRIPTION OF THE INVENTION

More particularly according to this invention, the organopolysiloxanes to be polycondensed can widely vary. Exemplary are the $\alpha,\omega$-bis-hydroxysilylpolysiloxanes. Also exemplary are the branched polysiloxanes obtained, for example, by the co-hydrolysis of mono-, di-, tri- or tetra-chlorinated organochlorosilanes used in varying proportions and containing a relatively high proportion of diorganodichlorosilane.

Too, such starting material organopolysiloxanes can be crosslinked polysiloxanes containing a relatively high proportion of trifunctional or tetrafunctional siloxane units. By way of example, the branched or crosslinked polysiloxanes are usually obtained from the following organochlorosilanes: $SiCl_4$, $CH_3SiCl_3$, $C_6H_5SiCl_3$, $(CH_3)_2SiCl_2$, $(CH_3)(CH_2=CH)SiCl_2$, $CH_3(C_6H_5)SiCl_2$, $(C_6H_5)_2SiCl_2$, $(CH_3)_3SiCl$, $(CH_3)_2(C_6H_5)SiCl$ and $(CH_3)_2(CH_2=CH)SiCl$. The ratio of the total number of organic substituents bonded to the silicon atoms to the total number of silicon atoms typically is between 0.8 and 2.5. The various organopolysiloxanes comprising hydroxysilyl functions are described, for example, in Chapter 6 of the above-mentioned treatise by Walter Noll.

In general, the organic substituents which are bonded to the various silicon atoms in the polysiloxanes comprising hydroxysilyl functions can vary widely. Such substituents, which can either be identical or different, include:

(i) alkyl radicals or haloalkyl radicals having from 1 to 5 carbon atoms and containing from 1 to 6 chlorine and/or fluorine atoms;

(ii) cycloalkyl radicals and halocycloalkyl radicals having from 3 to 8 carbon atoms and containing from 1 to 4 chlorine and/or fluorine atoms;

(iii) aryl radicals, alkylaryl radicals and haloaryl radicals having from 6 to 8 carbon atoms and containing from 1 to 4 chlorine and/or fluorine atoms; and (iv) cyanoalkyl radicals having from 3 to 4 carbon atoms.

By way of illustration, the following radicals are exemplary of the aforenoted organic radicals typically bonded to the silicon atoms of the subject polysiloxanes: methyl, ethyl, propyl, isopropyl, butyl, isobutyl, $\alpha$-pentyl, t-butyl, chloromethyl, dichloromethyl, $\alpha$-chloroethyl, $\alpha\beta$-dichloroethyl, fluoromethyl, difluoromethyl, $\alpha,\beta$-difluoroethyl, 3,3,3-trifluoropropyl, trifluorocyclopropyl, 4,4,4-trifluorobutyl, 3,3,4,4,5,5-heptafluoropentyl, $\beta$-cyanoethyl, $\gamma$-cyanopropyl, phenyl, p-chlorophenyl, m-chlorophenyl, 3,5-dichlorophenyl, trichlorophenyl, tetrachlorophenyl, o-, p- or m-tolyl, $\alpha,\alpha,\alpha$-trifluorotolyl and xylyl, such as 2,3-dimethylphenyl or 3,4-dimethylphenyl, groups.

Such organic substituents bonded to the silicon atoms are preferably methyl, phenyl or vinyl radicals, it being possible for these radicals to be optionally halogenated, or to comprise cyanoalkyl radicals.

The process according to the invention, moreover, is especially well adapted for the polycondensation of linear $\alpha,\omega$-bis-hydroxysilylorganopolysiloxanes by enabling rapid preparation of a polysiloxane "oil" containing OH end groups and having a high viscosity (of more than 50,000 centipoises at 20° C.). The polysiloxanes employed during the polycondensation reaction can contain a varying number of silicon atoms in one and the same molecule; such number is generally between 3 and 1,000.

In accordance with one embodiment of the process of the present invention, various polysiloxanes comprising hydroxysilyl functions can be polycondensed simultaneously, these polysiloxanes differing from one another by the chemical nature of the organic substituents bonded to the silicon atoms, by the value of the ratio of the total number of organic substituents bonded to the silicon atoms to the total number of silicon atoms, by the value of the average molecular weights, etc. In accordance with this method, it is possible to obtain, e.g., block copolycondensates consisting, for example, of polydimethylpolysiloxane and polydiphenylpolysiloxane units, and the like.

The polyheteromacropolycyclic co-catalyst according to this invention is a polyheteromacrobicyclic compound having the structural formula:

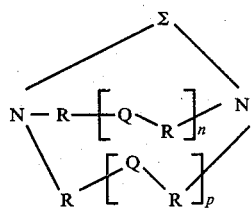  (I)

in which the various symbols have the following meanings:

Σ represents:
a divalent radical of the formula

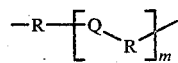  (II)

or
a divalent radical of the formula:

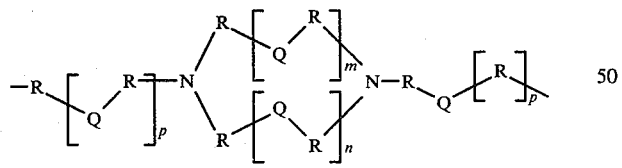  (III)

And in these formulae I, II and III, the various symbols have the following meanings:
the radicals R, which are identical or different, represent divalent hydrocarbon radicals;
the radicals Q, which are identical or different, represent either an oxygen or sulfur atom or a divalent hydrocarbon radical; and
the symbols m, n and p are integers equal to 1, 2 or 3.

These polyheteromacrobicyclic co-catalysts are per se described, for example, in French Pat. No. 2,201,304 and in the following literature articles: *Journal of the American Chemical Society,* 89, 7,017 (1967); ibid, 89, 2,495 (1967); *Chemische Zeitung,* 97 (11), pages 600–661 (1973); *Tetrahedron Letters,* 15, pages 1,225-28 (1973); and ibid, 29, pages 1,629–58 (1973). More precisely, if R and Q represent a divalent hydrocarbon radical, the latter preferably contains from 2 to 12 carbon atoms and, thus, additionally preferably represent a linear or branched chain alkylene or alkenylene radical, a cycloalkylene radical which is optionally substituted by alkyl radicals, a phenylene radical, an alkylphenylene radical or a dialkylphenylene radical. The groups R which are bonded to the two terminal, or heterocyclic nitrogen atoms in the formula I structure preferably have an aliphatic moiety directly bonded to the corresponding nitrogen atom. Preferably, R and Q (when same represent a hydrocarbon radical) are alkylene and alkenylene groups having a linear or branched chain, having from 2 to 8 carbon atoms, such as ethylene, propylene, butylene and hexylene groups, and their unsaturated analogs.

The preferred polyheteromacrobicyclic co-catalysts are those having the following structural formulae:

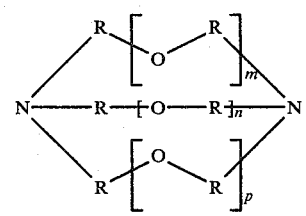  (IV)

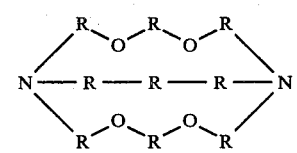  (V)

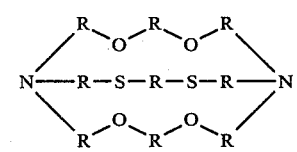  (VI)

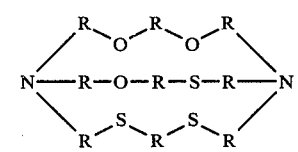  (VII)

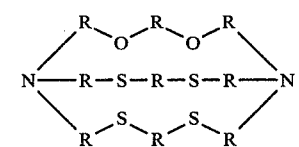  (VIII)

In the immediately aforesaid formulae, the various symbols have the following meanings:
m, n and p represent integers equal to 1, 2 or 3, and R represents one of the following radicals:

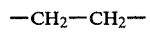

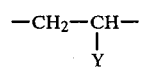

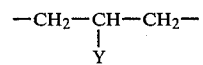

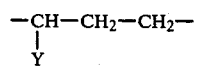

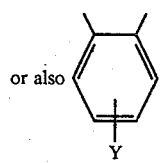

Y representing a linear or branched chain alkyl radical having from 1 to 4 carbon atoms.

More particularly, the preferred polyheteromacrobicyclic co-catalysts are those having the following structural formulae:

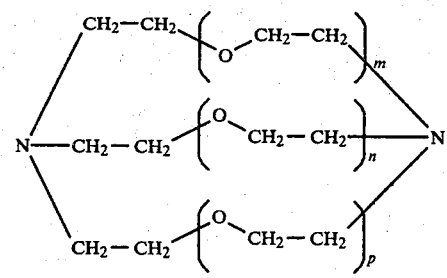
(IX)

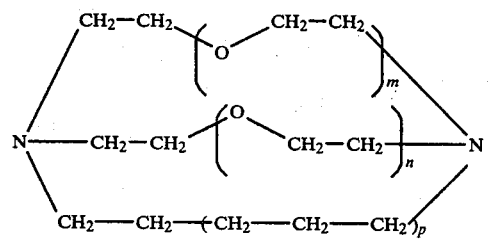
(X)

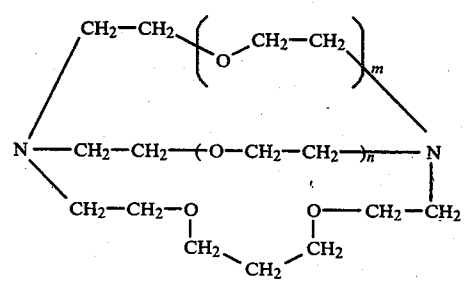
(XI)

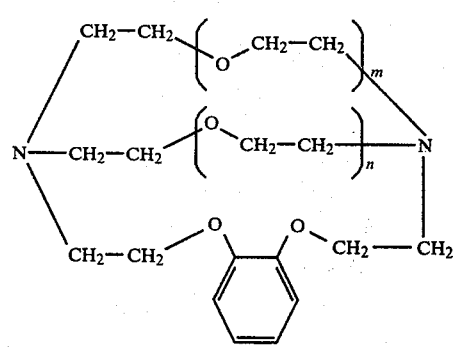
(XII)

Particular representative examples of co-catalysts having the following structural formula:

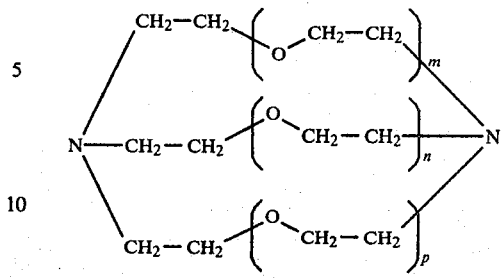
(IX)

are those in which the numbers n and p are integers from 1 to 3 and in which m is equal to 2 or 3, for example:

for m=2, n=1 and p=1: 1,10-diaza-4,7,13,18-tetraoxabicyclo[5,5,8]eicosane, hereinafter referred to as compound (211), for m=2, n=2 and p=1: 1,10-diaza-4,7,13,16,21-pentaoxabicyclo[8,8,5]tricosane, hereinafter referred to as compound (221), for m=2, n=2 and p=2: 1,10-diaza-4,7,13,16,21,24-hexaoxabicyclo[8,8,8]hexacosane, hereinafter referred to as compound (222), and for m=3, n=2 and p=2: 1,13-diaza-4,7,10,16,19,24,27-heptaoxabicyclo[8,8,11]nonacosane, hereinafter referred to as compound (322).

Other representative co-catalysts include:

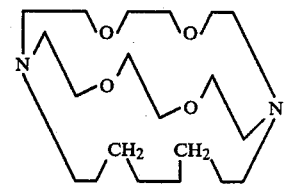

1,10-diaza-13,16,21,24-tetraoxabicyclo[8,8,8]hexacosane, hereinafter referred to as compound (220),

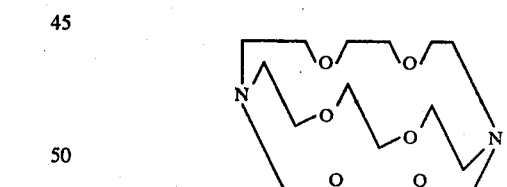

1,10-diaza-4,7,13,16,21,25-hexaoxabicyclo[8,8,9]heptacosane, hereinafter referred to as compound (22p),

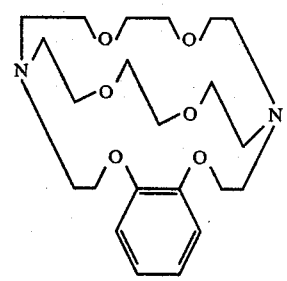

1,10-diaza-4,7,13,16,21,24-hexaoxa-5,6-benzobicyclo[8,8,8]hexacosane, hereinafter referred to as compound (22B),

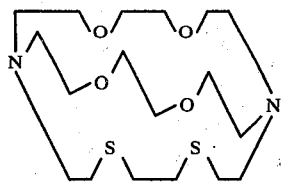

1,10-diaza-4,7,13,16-tetraoxa-21,24-dithiabicyclo[8,8,8-]hexacosane, hereinafter referred to as (402S),

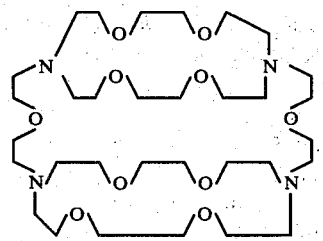

1,7,16,22-tetraaza-4,10,13,19,25,28,33,36,41,44-decaoxatricyclo [20.8$^{1,22}$.8$^{7,16}$]hexatetracontane, hereinafter referred to as T$_2$O, and

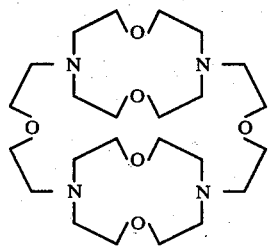

Any alkali metal or alkaline earth metal can be employed in the process according to the invention and same can be introduced in any form customary to anionic polymerization techniques. Thus, hydroxides, metal amides, alcoholates, siliconates and silanolates can, in particular be employed. Furthermore, it is also possible to directly introduce the metallic element in the form of divided metal. Derivatives of lithium, sodium, potassium, rubidium and cesium are preferably employed and same are preferably associated with the co-catalysts having the formulae IV to VIII or IX to XII.

The catalytic system utilized for catalyzing the polycondensation reaction according to the invention can be employed in widely varying proportions. Indeed, the subject process is most notable because of the fact that the catalyst can be used in very small amounts. Normally, from 0.1 to 1,000 mg equivalents, and preferably from 1 to 100 mg equivalents, of alkali metal hydroxide or alkaline earth metal hydroxide are used per kg of hydroxysilylpolysiloxane. The hydroxide equivalent for any alkali metal derivative or alkaline earth metal derivative is expressed as the weight of the amount of metal hydroxide which would have to be added and which would correspond to the same number of gram atoms of alkali metal or alkaline earth metal as that of the alkali metal derivative or alkaline earth metal derivative used.

Furthermore, the molar ratio of bicyclic co-catalyst/equivalents of alkali metal hydroxide or alkaline earth metal hydroxide is advantageously between 0.005 and 3, and preferably between 0.01 and 1.

The temperature for the polycondensation reaction is conventional, falling within the typical temperature range of between 25° and 200°, and preferably between 80° and 180°. During the polycondensation, the water is removed from the reaction medium as it is formed by any suitable means (azeotropic distillation, removal of the water under reduced pressure, or the like). Under these conditions, the subject process enables reduction in the duration of the polycondensation reaction to a very significant extent. Compared with the alkali metal catalyst used by itself, such reduction is on the order of, and can even exceed 50 to 75%. When the desired viscosity has been reached, it is recommended to deactivate the catalyst system by adding a very small amount of an acid compound (acetic acid, phosphoric acid, $CO_2$ or the like).

The polycondensates prepared according to the invention contain hydroxysilyl end groups. However, it is also possible to obtain polycondensed polysiloxanes, the ends or terminal moieties of which do not consist of hydroxysilyl functions. To accomplish this, it suffices to add, after the polycondensation has been completed, a compound which is capable of reacting with the hydroxysilyl end groups. In this context, trimethylchlorosilane, dimethylvinylchlorosilane, methyldivinylchlorosilane and the like are representative. It will be appreciated that these compounds modify the ends of the chains of the polycondensates and at the same time deactivate the catalyst system.

The polycondensation reaction of the polysiloxanes, containing hydroxysilyl groups, of the linear, branched or crosslinked type can optionally be carried out in a solvent medium. In this context, optionally halogenated aliphatic or aromatic hydrocarbons are suitable.

From an industrial point of view, the process according to the invention is of considerable value because it makes it possible in particular, to obtain α,ω-dihydroxylpolydimethylsiloxane oils of high viscosity (more than 50,000 centipoises at 20°), which contain less than 1% of low molecular weight polysiloxanes (cyclosiloxanes of the type $D_x$, with $3 \leq x \leq 10$, or also linear polysiloxanes), starting from low molecular weight, linear α,ω-dihydroxylpolydimethylpolysiloxane oligomers and with rapid kinetics. These oils can be used directly, without any other subsequent treatment, to obtain organopolysiloxane elastomers possessing excellent mechanical properties.

In order to further illustrate the present invention and the advantages thereof, the following specific examples are given, it being understood that same are intended only as illustrative and in nowise limitative.

EXAMPLES 150 g of an α,ω-bis-(hydroxydimethylsilyl)-polydimethylpolysiloxane having a number-average molecular weight of 2,900 (viscosity: 120 mPa.s at 25°), and a varying amount of the co-catalyst (222) having the formula:

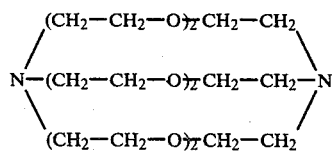

were introduced into a stirred glass reactor. After the mixture had been heated to the desired temperature, the alkali metal (potassium added in the form of K silanolate in an amount corresponding to 1.66 mg of KOH) was added.

The pressure in the reactor was then rapidly brought to 20 mm of mercury such that the water was removed immediately as it was formed. The reaction was stopped at predetermined point by deactivating the catalyst with carbon dioxide. After cooling, the progress of the reaction was evaluated by measuring the viscosity of the polycondensate at 25°.

The following table specifies the operating conditions and the results obtained:

TABLE

| Experiment | Amount of alkali metal, expressed in mg of KOH | Amount of co-catalyst (2.2.2) in mg | T° | Duration, minutes | Viscosity at 25°, mPa·s | Proportion of volatile products, % |
|---|---|---|---|---|---|---|
| 1 | 1.6 | 0.3 | 125 | 13 | 114,000 | less than 1.5% |
| 2 | 1.6 | 0.3 | 135 | 8 | 60,400 | less than 1.5% |

By way of comparison, the same experiment as Experiment No. 1 was repeated, but without adding the co-catalyst.

After a polycondensation time of 13 minutes, the resulting viscosity was only 8,700 mPa.s.

The proportion of volatile products was measured in the following manner: an accurately weighed amount of about 2 g of oil was introduced into an aluminum cup which was heated to 150° C. over the course of 2 hours. After cooling, the cup was weighed in order to determine weight loss.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a high molecular weight organopolysiloxane by polycondensation of a hydroxysilylated polysiloxane, essentially without formation of low molecular weight polysiloxane, which comprises polycondensing such polysiloxane, essentially without equilibration thereof, in the presence of a catalytic amount of a catalyst system comprising (i) an alkali or alkaline earth metal, and (ii) a polyheteromacropolycyclic cryptate co-catalyst having the structural formula:

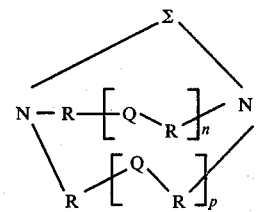

wherein Σ is a divalent radical having the structural formula

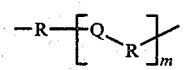

or a divalent radical having the structural formula:

(III)

further wherein each R, which may be identical or different, is a divalent hydrocarbon radical, each Q, which also may be identical or different, is a divalent hydrocarbon radical, an oxygen atom or a sulfur atom, and m, n and p are each integers equal to 1, 2 or 3.

2. The process as defined by claim 1, wherein the co-catalyst (ii) is selected from the group consisting of those having the structural formulae:

(IV)

(V)

(VI)

-continued

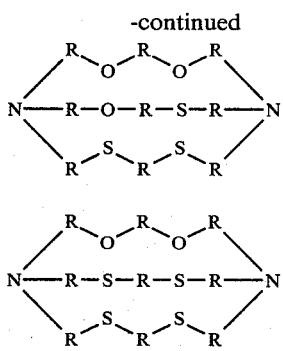

wherein m, n and p are integers from 1 to 3, and each R, which may be identical or different, is

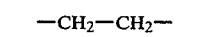
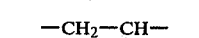

or 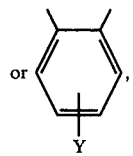, with Y being a linear or branched chain alkyl radical having from 1 to 4 carbon atoms.

3. The process as defined by claim 1, wherein the co-catalyst (ii) is selected from the group consisting of those having the structural formulae:

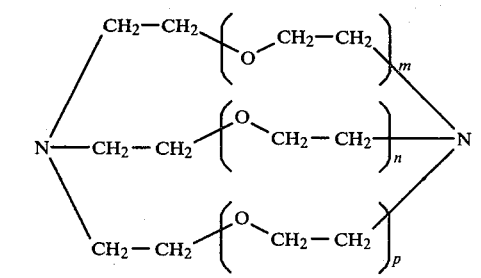

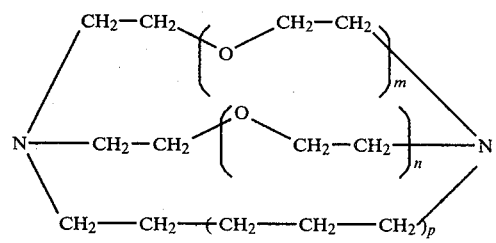

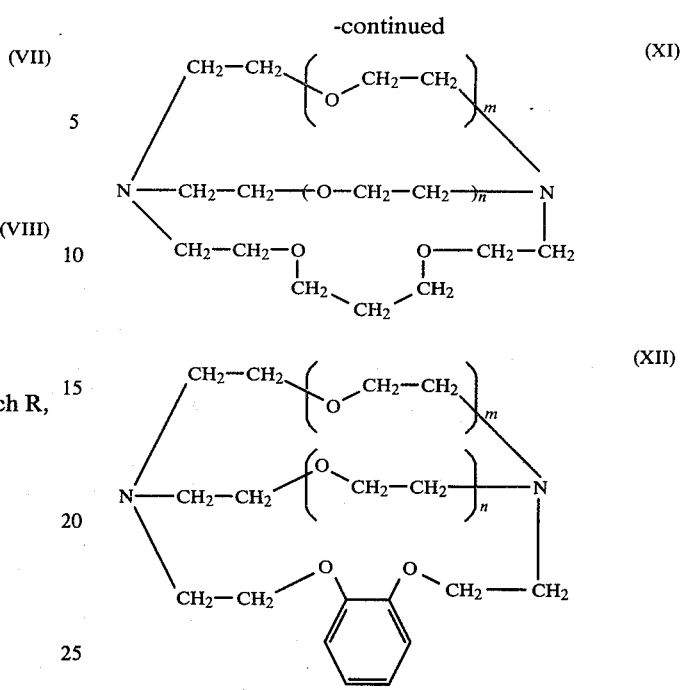

wherein m, n and p are integers from 1 to 3.

4. The process as defined by any of claims 2, 3 or 1, wherein the alkali or alkaline earth metal (i) is selected from the group consisting of lithium, sodium, potassium, rubidium and cesium.

5. The process as defined by claim 4, wherein said catalyst system comprises from 0.1 to 1,000 mg equivalents of alkali metal hydroxide or alkaline earth metal hydroxide per kg of hydroxysilylpolysiloxane.

6. The process as defined by claim 5, wherein said catalyst system comprises a molar ratio co-catalyst (ii)-/equivalents of alkali metal hydroxide or alkaline earth metal hydroxide (i) of between 0.005 and 3.

7. The process as defined by any of claims 2, 3 or 1, said hydroxysilylated polysiloxane comprising substituents directly bonded to the silicon atoms thereof selected from the group consisting of:
  (a) alkyl radicals or haloalkyl radicals having from 1 to 5 carbon atoms and containing from 1 to 6 chlorine and/or fluorine atoms,
  (b) cycloalkyl radicals and halocycloalkyl radicals having from 3 to 8 carbon atoms and containing from 1 to 4 chlorine and/or fluorine atoms,
  (c) aryl radicals, alkylaryl radicals and haloaryl radicals having from 6 to 8 carbon atoms and containing from 1 to 4 chlorine and/or fluorine atoms; and
  (d) cyanoalkyl radicals having from 3 to 4 carbon atoms.

8. The process as defined by claim 7, said substituents directly bonded to the silicon atoms being selected from the group consisting of methyl, phenyl, vinyl, halogenated such radicals, and cyanoalkyl.

9. The process as defined by claim 8, said hydroxysilylated polysiloxane being a linear α,ω-bis-hydroxysilylpolydiorganosiloxane.

10. The process as defined by claim 8, said hydroxysilylated polysiloxane being a branched chain polysiloxane.

11. The process as defined by claim 8, said hydroxysilylated polysiloxane being a crosslinked polysiloxane.

12. The process as defined by any of claims 2, 3 or 1, the same being conducted in solvent medium.

13. The process as defined by claim 1, said co-catalyst (ii) having the structural formula (II).

14. The process as defined by claim 1, said co-catalyst (ii) having the structural formula (III).

15. The process as defined by claim 2, said co-catalyst (ii) having the structural formula (IV).

16. The process as defined by claim 2, said co-catalyst (ii) having the structural formula (V).

17. The process as defined by claim 2, said co-catalyst (ii) having the structural formula (VI).

18. The process as defined by claim 2, said co-catalyst (ii) having the structural formula (VII).

19. The process as defined by claim 2, said co-catalyst (ii) having the structural formula (VIII).

20. The process as defined by claim 3, said co-catalyst (ii) having the structural formula (IX).

21. The process as defined by claim 3, said co-catalyst (ii) having the structural formula (X).

22. The process as defined by claim 3, said co-catalyst (ii) having the structural formula (XI).

23. The process as defined by claim 3, said co-catalyst (ii) having the structural formula (XII).

24. The process as defined by claim 1, further comprising end-capping the resulting high molecular weight organopolysiloxane with trimethylchlorosilane, dimethylvinylchlorosilane or methyldivinylchlorosilane.

* * * * *